Sept. 9, 1930.  H. WAGGONER ET AL  1,775,231
WINDOW WIPER
Filed Nov. 11, 1929
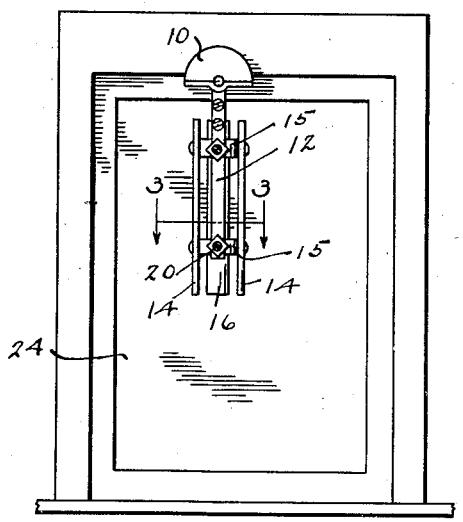
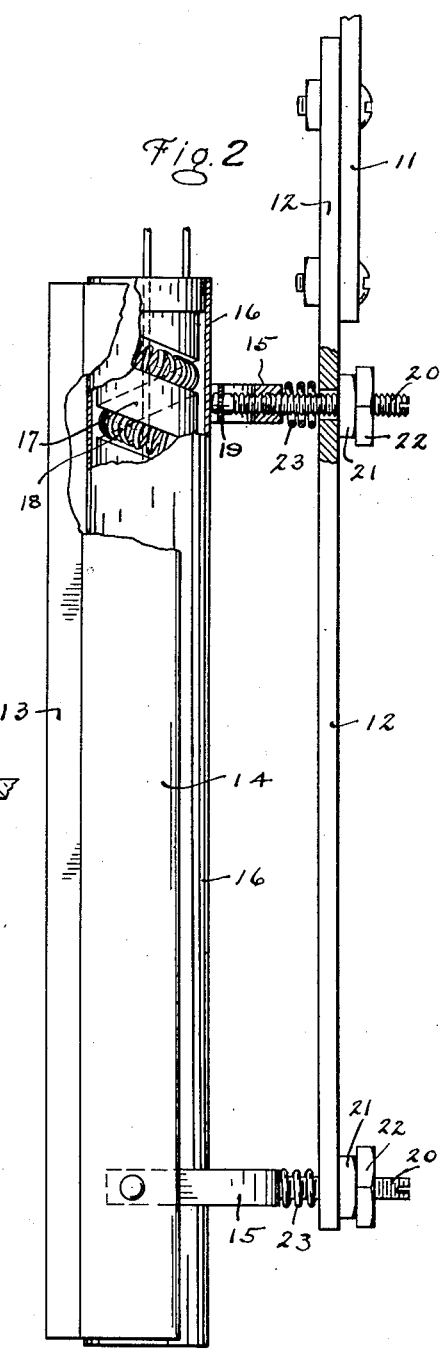
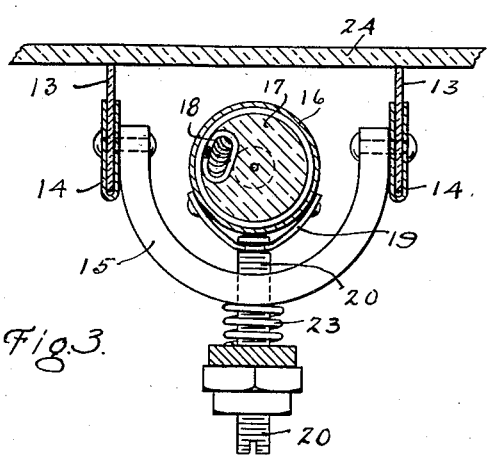
INVENTORS,
Harry Waggoner, and
Carl H. Waggoner,
BY Minturn & Minturn,
Attorneys.

Patented Sept. 9, 1930

1,775,231

UNITED STATES PATENT OFFICE

HARRY WAGGONER AND CARL H. WAGGONER, OF INDIANAPOLIS, INDIANA

WINDOW WIPER

Application filed November 11, 1929. Serial No. 406,492.

This invention relates to the art of wind shield wipers and particularly to the wiper bar. The primary purpose of the invention is to provide a wiper bar that is not only suited to wipe off the surface of a glass but also to provide a circulation of heat therearound in order to prevent the accumulation of snow, ice, or sleet, on the glass that would otherwise obscure the vision of a person therebehind.

Other objects reside in the provision of means permitting the adjustment of a heating element in relation to the surface of the glass and also to provide a yielding attachment of the wiper to an operating mechanism.

Other objects reside in the simplicity of the construction affording durability and a low cost of production.

These and other objects will become apparent in the following description of the invention as illustrated by the accompanying drawing, in which—

Fig. 1, is a front elevation of a window to which our invention is applied;

Fig. 2, is a side elevation of the wiper; and

Fig. 3, is a horizontal transverse section through the wiper on the line 3—3 in Fig. 1.

Like characters of reference indicate like parts throughout the several views in the drawing.

From any suitable operating mechanism 10, the detail construction of which does not here form a part of the invention, and its depending oscillating arm 11, we attach thereto a bar 12 to extend therebeyond in the same straight line.

We employ the customary rubber 13 gripped within the U-shaped bars 14, and across the bars 14, in a parallel spaced apart relation by means of the two yokes 15, one toward each of the ends of the bars 14. The yokes 15 are secured by their outer free ends to the respective bars 14 so as to have the yokes 15 bowed outwardly therefrom, the yokes 15 being substantially semi-circular in shape.

Within a metallic tube 16 we mount a porcelain insulator 17 around which is carried a resistance wire 18 serving as a heating element. A strap 19 is secured by its ends to the tube 16 near each of the ends of the tube to correspond with the spacing of the yokes 15 one from another and a screw 20 is rotatably secured to each strap 19 by being passed therethrough and heated over on the side toward the tube. Each screw 20 is screw-threadedly carried through the respective yokes 15 and slidably through the bar 12 to have the adjacent and lock nuts 21 and 22 thereon adapted to contact the bar 12 from the outer or front side. A compression spring 23 is carried around each screw 20 between the yoke 15 and the bar 12 to yieldingly space the yoke from the bar.

It is to be noted that by reason of the above construction, rotation of either screw 20 without turning the nuts 21 and 22 thereon will cause the tube 16 to be carried toward or away from the respective yoke 15 depending upon the direction of rotation, one screw 20 being obviously capable of being turned independently of the other so as to vary the degree of alignment of the tube 16 in relation to the glass 24. A second adjustment is also available in either yoke by holding the screw 20 stationary and revolving the nuts 21 and 22 thereon which may increase or decrease the space between the yoke 15 and the bar 12 dependent upon the direction of rotation thereof, the spring 23 always tending to carry the yoke 15 away from the bar 12.

It is therefore to be noted that there is no housing from one bar 14 to the other over the tube 16. This space is purposely left open to permit the wind to strike the tube and enter between the bars 14 and even pass around back of the tube 16, so as to carry a current of warmed air against the glass 24 and prevent undue heating of the rubbers 13.

The wiper hereinabove described has one particular use as applied to the front window of an interurban or street car where a relatively high voltage of current is available so that the wire 18 may be positioned to supply sufficient heat for the purpose.

While we have here shown and described our invention in the one form as now best known to us, it is obvious that structural deviations may be made therefrom without departing from the spirit of the invention, and we therefore do not desire to be limited to that precise form or any more than may be required by the following claims.

We claim:

1. In a window wiper, a pair of wiping members, yokes securing the members in spaced apart relation, a reciprocating bar, and adjusting members extending from said bar to said yokes, and a heating unit between the members, said adjusting members carrying said unit.

2. In a window wiper, a pair of wiping members, yokes securing the members in spaced apart relation, a reciprocating bar, and adjusting members extending from said bar to said yokes, and a heating unit between the members, said adjusting members carrying said unit, and spring means between said yokes and said bar normally extending the yokes therefrom.

3. In a window wiper, a pair of wiping members, yokes securing the members in spaced apart relation, a reciprocating bar, and adjusting members extending from said bar to said yokes, and a heating unit between the members, said adjusting members carrying said unit, said adjustable members comprising screws slidingly passed through the bar, screw-threadedly through the yokes and rotatably secured to said unit with nuts on the screws to contact the bar from the side removed from the yokes.

In testimony whereof we affix our signatures.

HARRY WAGGONER.
CARL H. WAGGONER.